US009686491B2

(12) United States Patent
Segura Puchades

(10) Patent No.: US 9,686,491 B2
(45) Date of Patent: Jun. 20, 2017

(54) DEVICE AND METHOD TO CONTROL A DURATION OF INTEGRATION IN A PHOTOSENSITIVE DEVICE HAVING A MATRIX OF PHOTOSENSITIVE PIXELS

(71) Applicants: COMMISSARIAT A L'ENERGIE ATOMIQUE ET AUX ENERGIES ALTERNATIVES, Paris (FR); SAFRAN, Paris (FR)

(72) Inventor: Josep Segura Puchades, Fontaine (FR)

(73) Assignees: COMMISSARIAT A L'ENERGIE ATOMIQUE ET AUX ENERGIES ALTERNATIVES, Paris (FR); SAFRAN, Paris (FR)

( * ) Notice: Subject to any disclaimer, the term of this patent is extended or adjusted under 35 U.S.C. 154(b) by 0 days.

(21) Appl. No.: 14/948,104

(22) Filed: Nov. 20, 2015

(65) Prior Publication Data
US 2016/0150170 A1    May 26, 2016

(30) Foreign Application Priority Data

Nov. 24, 2014    (FR) ...................................... 14 61387

(51) Int. Cl.
*H04N 5/374*    (2011.01)
*H04N 5/378*    (2011.01)
(Continued)

(52) U.S. Cl.
CPC ............. *H04N 5/374* (2013.01); *G01T 1/247* (2013.01); *H04N 5/32* (2013.01); *H04N 5/378* (2013.01);
(Continued)

(58) Field of Classification Search
CPC ........ H04N 5/374; H04N 5/3741; H04N 5/32; H04N 5/378
See application file for complete search history.

(56) References Cited

U.S. PATENT DOCUMENTS 6,529,242 B1    3/2003    Panicacci
2007/0109434 A1*    5/2007    Puchades ............... H04N 3/155
                                                          348/294
(Continued)

FOREIGN PATENT DOCUMENTS

EP    0 364 314 A1    4/1990
FR    2 593 987 A1    8/1987
(Continued)

*Primary Examiner* — Tuan Ho
(74) *Attorney, Agent, or Firm* — Baker & Hostetler LLP

(57) ABSTRACT

A control method for a photosensitive device comprises a matrix of photosensitive pixels distributed at the intersections of rows and columns of the matrix, each of the pixels comprising a photosensitive element able to generate an electrical signal under the effect of incident radiation and a switch controlled by a row conductor, the switch allowing the electrical signal to be transferred to a column conductor, the device further comprising a readout circuit connected to the column conductor to read out successively the various pixels connected to the column conductor, the method consisting, for each of the pixels, in activating the switch a first time by deactivating the associated readout circuit and in activating the switch a second time by activating the associated readout circuit, the duration separating the first activation and the second activation of the switch being equal to a predefined duration of integration.

9 Claims, 6 Drawing Sheets

(51) Int. Cl.
*H04N 5/32* (2006.01)
*H04N 5/376* (2011.01)
*G01T 1/24* (2006.01)

(52) U.S. Cl.
CPC ......... *H04N 5/3741* (2013.01); *H04N 5/3765* (2013.01)

(56) References Cited

U.S. PATENT DOCUMENTS

2007/0229688 A1   10/2007  Apard et al.
2016/0112662 A1*   4/2016  Guillon ................ H04N 5/3698
                                                    348/294

FOREIGN PATENT DOCUMENTS

| FR | 2 760 585 A1 | 9/1998 |
| FR | 2 762 741 A1 | 10/1998 |
| FR | 2 861 242 A1 | 4/2005 |
| FR | 2 965 440 A1 | 3/2012 |
| WO | 2013/007695 A1 | 1/2013 |

* cited by examiner

DEVICE AND METHOD TO CONTROL A DURATION OF INTEGRATION IN A PHOTOSENSITIVE DEVICE HAVING A MATRIX OF PHOTOSENSITIVE PIXELS

CROSS-REFERENCE TO RELATED APPLICATION

This application claims priority to foreign French patent application No. FR 1461387, filed on Nov. 24, 2014, the disclosure of which is incorporated by reference in its entirety.

FIELD OF THE INVENTION

The present invention relates to a control method for a photosensitive device comprising a matrix of photosensitive pixels of the type notably produced by semiconductor material deposition techniques. The invention also relates to a photosensitive device configured to implement the method. The invention can be implemented in many applications, such as for example X-ray medical imaging or fingerprint detection.

BACKGROUND

Many current image sensors are composed of pixels containing multiple transistors, produced for example by means of CMOS or "Complementary Metal Oxide Semiconductor" technologies. CMOS technologies allow a high degree of integration to be obtained. For example, pixels are known comprising, in addition to a photosensitive element such as a diode, three transistors. These pixels are known as 3T pixels. One of the internal transistors of the pixel is used for resetting the charges accumulated in the photosensitive element, the second transistor is used as a follower and the third allows the readout of the pixel by connecting the output of the follower transistor to a column conductor. This type of pixel requires a reset command and a readout command. These two commands are generally conveyed by row conductors.

Certain devices employ alternative, less expensive, technologies based on thin-film deposition. The pixels forming such a device generally comprise a photosensitive element associated with an element fulfilling a switching function. The photosensitive element is for example formed by a diode, mounted in series with the switching element. The switching element can for example be a transistor or a diode, known as a switching diode, the "closed" or "on" state of which allows the charges accumulated in the photosensitive diode during illumination to be read out, and the "open" or "off" state of which allows the photosensitive diode to accumulate charges as a function of the illumination. The two diodes are mounted with opposite directions of conduction, in what is known as a "back-to-back" configuration.

These technologies implement thin-film field-effect transistors, or TFTs. In these thin-film techniques, many families are used. The transistors can be based on hydrogenated amorphous silicon (aSiH), polysilicon amorphous or crystalline indium, gallium, zinc oxide known by the abbreviation IGZO. Other families of transistors of TFT type can be implemented, such as for example organic TFTs.

Techniques for depositing thin semiconductor films on insulating substrates, of glass for example, allow matrices of photosensitive points to be produced which are able to generate an image from visible or near-visible radiation. In order to use these matrices in the detection of radiological images, a scintillating screen can be interposed between the X-ray radiation and the matrix to convert the X-ray radiation into light radiation in the wavelength band to which the pixels are sensitive.

In contrast to 3T pixels, the alternative technologies only have a single switching element. They only need a single control row per pixel, which is the reason for their simplicity. When the switching element is in the on state, the charges accumulated in the photosensitive element are transferred by a column conductor to a readout circuit. At the level of the pixel, there is no reset command. The transfer of the charges fulfils the function of resetting the pixel. In other words, the readout and reset operations are simultaneous.

A given pixel is only addressed once per frame. Consequently, its integration time is equal to the duration of the frame.

Control of the integration time can be achieved externally to the photosensitive matrix, for example by means of a shutter only allowing the incident illumination to reach the device for a fraction of the duration of the frame. In X-ray-based applications, the source is generally controlled. X-ray flashes are emitted according to the control of the frame. More generally, the exposure time of the photosensitive device is not controlled by the commands of the photosensitive matrix.

In video applications (capture of consecutive images) with control of the source (stroboscopy), even if the pixel in the integration state receives no light, the active element continues to generate noise. In the case of a photodiode, the dark current will be superposed over the useful signal, reducing the available dynamic range of the device.

If the incident radiation is continuous (no shutter), the disadvantage is the potential saturation of the pixel due to an excessive integration time in relation to the quantity of incident radiation. It is possible to reduce the integration time by increasing the speed of the frame. However, this reduction causes a decrease in the readout duration of each pixel and therefore requires an increase in the bandwidth. A photodiode behaves like a capacitor in which charges are stored during the integration time. When the quantity of charges exceeds a limit dependent on the bias of the photodiode, the surplus of charges can either flow into neighbouring pixels, generating crosstalk between pixels, or into the column conductor used for pixel readout by closing the switching element, generating an artefact in the image arising from the device in the form of a vertical line.

A control of the duration of integration independent of the duration of the frame may therefore prove to be useful in order to avoid these effects. This is possible in photosensitive devices of 3T type by means of the zeroing transistor but not in devices the pixels of which only comprise a single switching element.

SUMMARY OF THE INVENTION

The invention aims to mitigate all or part of the problems mentioned above by proposing a control method for a photosensitive device with a single switching element per pixel while allowing the duration of integration of each pixel to be controlled.

To this end, the object of the invention is a control method for a photosensitive device comprising a matrix of pixels distributed at the intersections of rows and columns of the matrix, each of the pixels comprising a photosensitive element able to generate an electrical signal under the effect of incident radiation and a selector switch controlled by a row conductor, the selector switch allowing the photosensitive element (12) to be connected to a column conductor, the device furthermore comprising a readout circuit connected to the column conductor and intended to read out successively the various pixels connected to the column conductor, the method leading each of the pixels to activate its selector switch a first time by deactivating the associated readout circuit and to activate its selector switch a second time by activating the associated readout circuit, the duration separating the first activation and the second activation of the selector switch being equal to a predefined duration of integration.

The second activation of the selector switch occurs during a readout phase of a given first pixel row to which the selector switch in question belongs, and in which the first activation of the selector switch of pixels of the given first row occurs during a readout phase of a second pixel row. These simultaneities allow the total duration of the frame not to be lengthened.

In a preferred embodiment, readout phases of the various rows of the matrix are linked together, each readout phase comprising two successive steps, a first of the two steps consisting in activating the selector switch and the readout circuit, a second of the two steps consisting in deactivating the selector switch and in zeroing the readout circuit, in which the first activation of the selector switch of the pixels of the given first row occurs during the second step of the readout phase of the second pixel row.

The total number of pixel rows is defined by N, the duration of a readout phase is defined by $T_{ligne}$. Advantageously, the predefined duration of integration $T_{int}=k*T_{ligne}$, where k is an integer smaller than or equal to N−2.

The duration of the first step can be greater than the duration of the second step, in order not to prolong the duration of the second step needlessly.

Advantageously, the device comprising a vertical register, control signals for the selector switches are generated via the vertical register, which comprises a shift register the successive outputs of which generate the signals in the order of the pixel rows, the shift register receiving at least two time-shifted tokens, the first of the two tokens allowing the first activation of the selector switch to be initiated, the second of the two tokens allowing the second activation of the selector switch to be initiated.

For each of the pixels, the first activation of the selector switch is repeated multiple times, the duration separating two successive first activations being smaller than the predefined duration of integration.

For each of the pixels, the first activation of the selector switch can be repeated on each deactivation of the readout circuit, except during the predefined duration of integration.

It is possible to predefine multiple distinct durations of integration, at least one of the durations of integration being preceded by the first activation of the selector switch by deactivating the associated readout circuit.

An additional object of the invention is a photosensitive device implementing a method according to the invention, the device comprising a vertical register configured to control the switches and the readout circuit in such a way as to implement the method.

BRIEF DESCRIPTION OF THE DRAWINGS

The invention will be better understood and other advantages will become apparent upon reading the detailed description of an embodiment given by way of example, this description being illustrated by the appended drawings in which.

For the sake of clarity, the same elements will bear the same references in the various figures.

DETAILED DESCRIPTION

A photosensitive device allowing the implementation of the invention comprises photosensitive pixels organized in a matrix. The pixels are arranged at the intersection of rows and columns of the matrix. In practice such devices can comprise a large number of photosensitive pixels. Matrices comprising many thousands of rows and columns, in which the pixels are identical, are commonplace.

Figure 1:
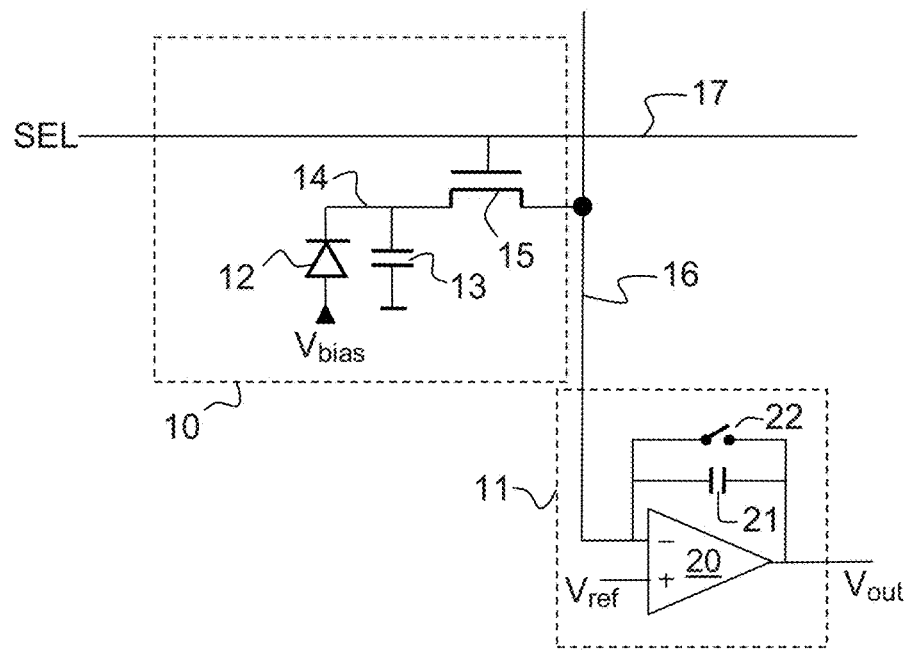
FIG. 1 is a schematic representation of a pixel associated with a readout circuit.

FIG. 1 shows a pixel 10 of the matrix, which pixel associated with a readout circuit 11 placed at one end of the column to which the shown pixel belongs. The readout circuit 11 is common to all of the pixels of one column but so as not to overload the figure, a single pixel is shown here.

The pixel 10 comprises a photosensitive element, such as for example a photodiode 12. Alternatively, other photosensitive elements can be implemented, such as for example a photoresistor or a phototransistor. The photodiode 12 has a parasitic capacitance 13 shown schematically in FIG. 1. The parasitic capacitance is exploited in the transformation of the incident radiation into electrical information. More specifically, the photodiode 12 carries out a conversion of the received photons to electrical charges stored in the capacitance 13 of the photodiode 12. The photodiode is reverse-biased by means of a negative voltage $V_{bias}$ present at its anode. The cathode of the photodiode 12 forms the node 14 of the pixel 10. Alternatively, it is possible to invert the assembly of the photodiode. The node of the pixel is then formed at the anode and the bias voltage, present on the cathode, is then positive. The voltage of the node 14 is a function of the illumination received by the pixel 10. The pixel 10 furthermore comprises an electronic switch, known as a selector switch, formed here by a transistor 15 allowing the node 14 to be connected to a column conductor 16 of the matrix. Alternatively, the function of electronic switch can also be fulfilled by a switching diode. The voltage of the node 14 is floating when the switch 15 is open. The transistor 15 is controlled by a signal SEL present on a row conductor 17 of the matrix. The row conductor 17 is common to all the pixels 10 of one row of the matrix. The transistors 15 of the various pixels 10 of one row are therefore simultaneously controlled by the same signal SEL. To read out the pixel 10, the signal SEL is activated and the charges accumulated at the node 14 are transferred onto the column conductor 16.

It is well understood that the designations "rows" and "columns" are conventional. These designations may be exchanged.

The readout circuit 11 comprises an amplifier 20, the inverting input of which is connected to the column conductor 16. The non-inverting input of the amplifier 20 receives a reference voltage $V_{ref}$. A capacitor 21 is placed in the feedback of the amplifier 20, between the output of the amplifier 20 and its inverting input. During the readout of the pixel 10, the charges accumulated at the node 14 are transferred by the transistor 15 to the capacitor 21. The output voltage $V_{out}$ of the amplifier 20 is then transferred to a multiplexer (not shown) formed for example by an assembly of switches controlled by a shift register. The multiplexer allows signals arising from the various columns of the matrix to be collected. The readout circuit 11 also comprises an electronic switch 22 connected in parallel to the capacitor 21. The switch 22 allows the readout circuit 11 to be zeroed. More specifically, during the readout of the pixel 10, the switch 22 is open and the electrical signal from the pixel is transposed as voltage $V_{out}$ to the output of the amplifier 20. Once the readout has been achieved, the readout circuit 11 is zeroed by closing the switch 22. The amplifier 20 thus behaves as a follower and the column conductor 16 takes the voltage $V_{ref}$. A readout phase of the pixel 10 therefore consists in linking two steps together. In a first step, the switch 22 is open, allowing the readout per se of the pixel 10 and in a second step, immediately following the first step, the switch 22 is closed in order to reset the potential of the capacitor 21.

Figure 2:
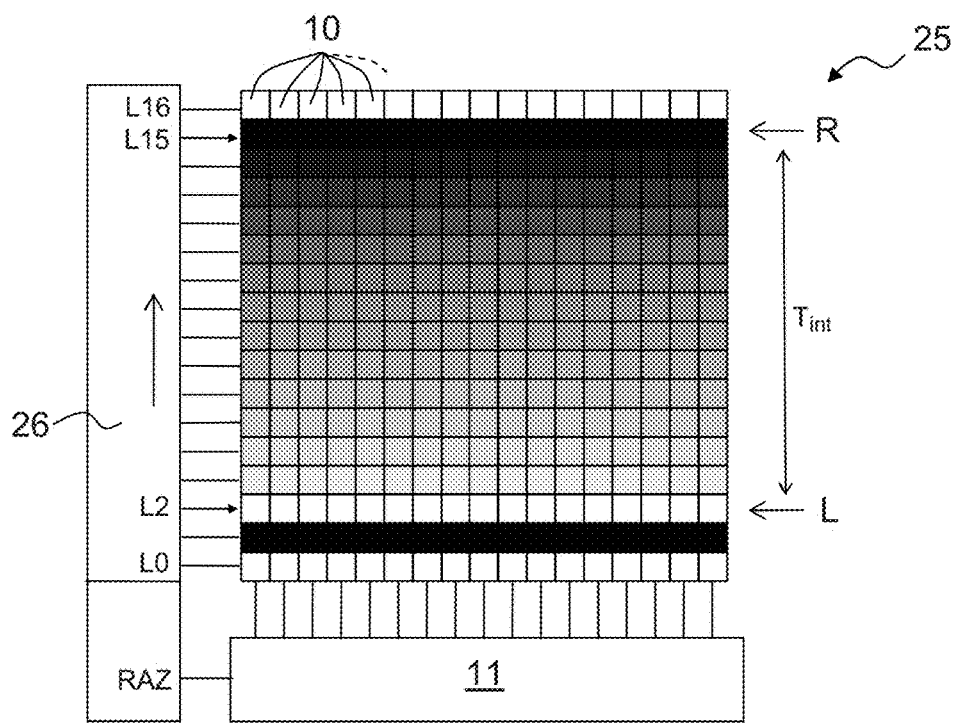
FIG. 2 shows a photosensitive device comprising the pixel and the readout circuit from FIG. 1, and implementing a method conforming to the invention.

FIG. 2 shows a photosensitive device 25 comprising 17 rows and 17 columns of pixels 10 organized in a matrix. The rows are numbered here L0 to L16. As stated above, the number of rows and columns is only given by way of example. Actual matrices generally comprise a greater number of rows or columns. The photosensitive device 25 furthermore comprises a vertical register 26 notably allowing the signals SEL of the various rows of the matrix to be generated. To this end, the vertical register 26 is connected to as many row conductors 17 as there are rows in the matrix. In addition, the readout circuit 11 is connected to all of the column conductors 16. The readout circuit 11 comprises as many amplifiers 20 as there are columns of pixels in the matrix. The readout circuit 11 allows the readout of the signals generated in the various pixels 10 as a function of the illumination received by each one. A separate block of the vertical register 26 allows a signal RAZ to be generated, allowing the control of the various switches 22 associated with each of the amplifiers 20 of the readout circuit 11. This block can also generate the clocks required by the readout circuit 11 and the associated multiplexer. This block can also be integrated into the vertical register 26.

The integration time of a pixel 10 is defined as the duration separating two successive activations of the signal SEL. Between these two activations, the switch 15 is open and the photodiode 12 is isolated from the column conductor 16, allowing an integration of the charges on its cathode. In order to control the integration time of each pixel 10, according to the invention, for a given pixel row 10, an "empty" readout phase is added, separate from the effective readout phase of the desired integration time. This empty readout phase consists of closing the switch 22 and simultaneously activating the signal SEL, in order to empty all of the charges from the node 14 to the output of the amplifier 20 configured as a follower ($V_{out}=V_{ref}$).

In other words, for each of the pixels, the method consists in activating the selector switch 15 a first time by deactivating the associated readout circuit 11 and activating the selector switch 15 a second time by activating the associated readout circuit 11. The duration separating the first activation and the second activation of the selector switch 15 being equal to a predefined duration of integration. The activation of the readout circuit 11 consists of an effective readout of the pixel 10 and the deactivation of the readout circuit consists of its use without effective readout, otherwise known as "empty readout" or resetting the pixel.

A frame is defined as a sequence of successive readout phases of all of the rows of the matrix. The invention allows a duration of integration smaller than the duration of a frame to be obtained. The first activation of the selector switch 15 of a given row (empty readout) can occur during a readout phase of another row. In order to avoid the simultaneous activation of two rows, the activation of the selector switch 15 of the given row in order to reset it, occurring at the beginning of the duration of integration, occurs during the second step of the readout phase of another row. In FIG. 2, the resetting of the row L15, denoted by R, occurs during the readout phase of the row L2, denoted by L, and more specifically during its second step.

Figure 3:
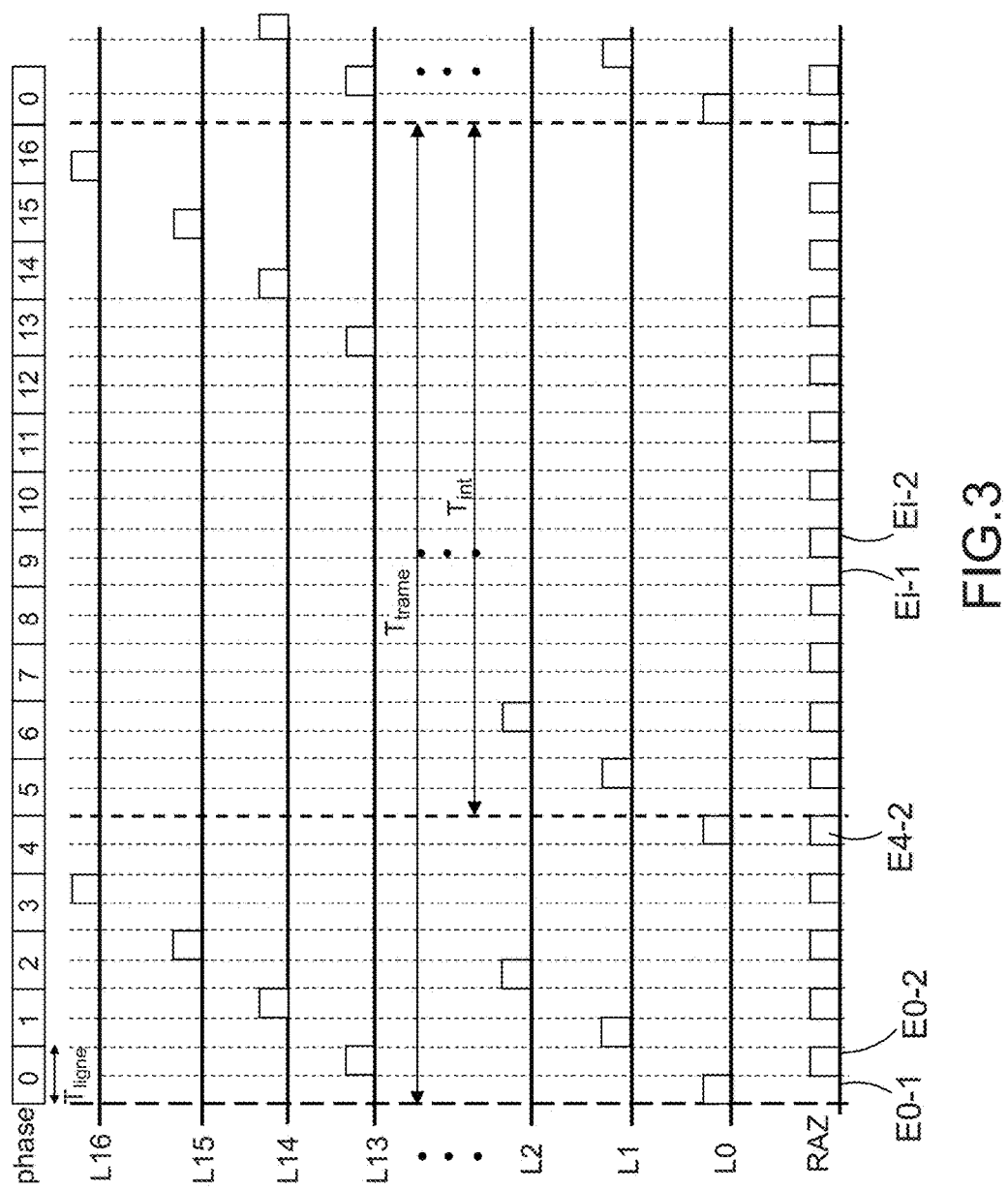
FIG. 3 shows, in the form of a timing diagram, various commands for the photosensitive device allowing the method described with the aid of FIG. 2 to be implemented.

FIG. 3 shows, in the form of a timing diagram, various commands for the photosensitive device 25. These commands are generated by the vertical register 26. In FIG. 2 the signals SEL of the various rows of pixels 10 of the photosensitive device 25 are shown. So as not to overload the figure, only the signals of the rows L0, L1, L2, L13, L14, L15 and L16 are shown. The signals SEL of the rows L3 to L12 can easily be deduced by time shift. In FIG. 3, the signal RAZ for controlling the various switches 22 of the readout circuit 11 is also shown. By convention, the various signals are shown in a low state when the controlled switch 22 is open and in a high state when the controlled switch 22 is closed. The voltages of the signals SEL and RAZ corresponding to the two levels are adapted to the switches 22 employed.

The time axis of the timing diagram is graduated in successive readout phases. The duration of a phase is denoted by $T_{ligne}$. This duration is uniform for all of the rows of the matrix and the readout phases link together in the order of the rows of the matrix. More specifically, during the phase 0, the readout of the row L0 is carried out. The two steps are here labelled E0-1 and E0-2. During the step E0-1, the signal SEL of the row L0 is activated (high level) and the switch 15 of each of the pixels of the row L0 is closed. During the step E0-2, the signal RAZ is at the high level, allowing the assembly of switches 22 of the readout circuit 11 to be closed. This step corresponds to the deactivation of the readout circuit 11. In other words, the capacitors 21 do not accumulate charges. The phase 0 is reproduced at the end of the timing diagram after the phase 16. The duration of a frame stretches between two identical phases. In FIG. 3, the duration of a frame is labelled $T_{trame}$ and is visualized between the beginning of two successive phases 0. The readout phases link together without downtime between phases, giving $T_{trame}=N \cdot T_{ligne}$, N representing the number of pixel rows 10 of the matrix. N=17 in the example shown.

The phase 1 immediately follows the phase 0 and so on. The readout phases of the various rows link together in the order of the rows. The phases of the various rows are all alike. Featured therein are the steps Ei-1 and Ei-2 for a current row i. The steps Ei-1 and Ei-2 are respectively similar to the steps E0-1 and E0-2.

In order to define a duration of integration $T_{int}$ smaller than the duration of the frame $T_{trame}$, the pixels of the various rows are reset once between two effective readouts.

More specifically, without additional reset, the duration of integration would be equal to the duration of the frame from which the duration of one reset sub-step is subtracted, i.e. approximately 16.5 durations of one phase in this example.

It will be noted that the additional reset of a pixel of a row Lj therefore appears, at the earliest, at the end of the readout phase (step Ei-2) of a row Li, which is read out just after the row Lj. In other words, the duration of integration $T_{int}$ is at most equal to $(N-2)*T_{ligne}$, which corresponds to a maximum duration smaller than the duration mentioned above $(16.5*T_{ligne})$ which would be obtained without addition reset.

In general, $T_{int}=k*T_{ligne}$, where k is an integer smaller than or equal to N−2. In the example shown, the pixels of the row L0 are reset during the phase 4 and more specifically during the step E4-2. Thus the duration of integration $T_{int}$ is equal to 12 phases, thus $T_{int}=k*T_{ligne}$, where k equals 12 in this example. Between the step E0-1 (effective readout of the row L0) and the step E4-2 (empty readout of the row L0), the integration carried out by the photodiodes 12 of the pixels 10 of the row L0 is simply evacuated by the column conductors 16 without being read out. For the other rows, the additional reset without the readout of a current row i occurs 4 phases after the step Ei-2 of the row in question. For example, for the row L13, the signal SEL is activated during the step E0-2.

The vertical register 26 can be formed by an address decoder. Alternatively, the vertical register 26 can be formed by a shift register, which takes up less area, requires fewer inputs and is relatively simple to integrate into TFT technology.

Figure 4:
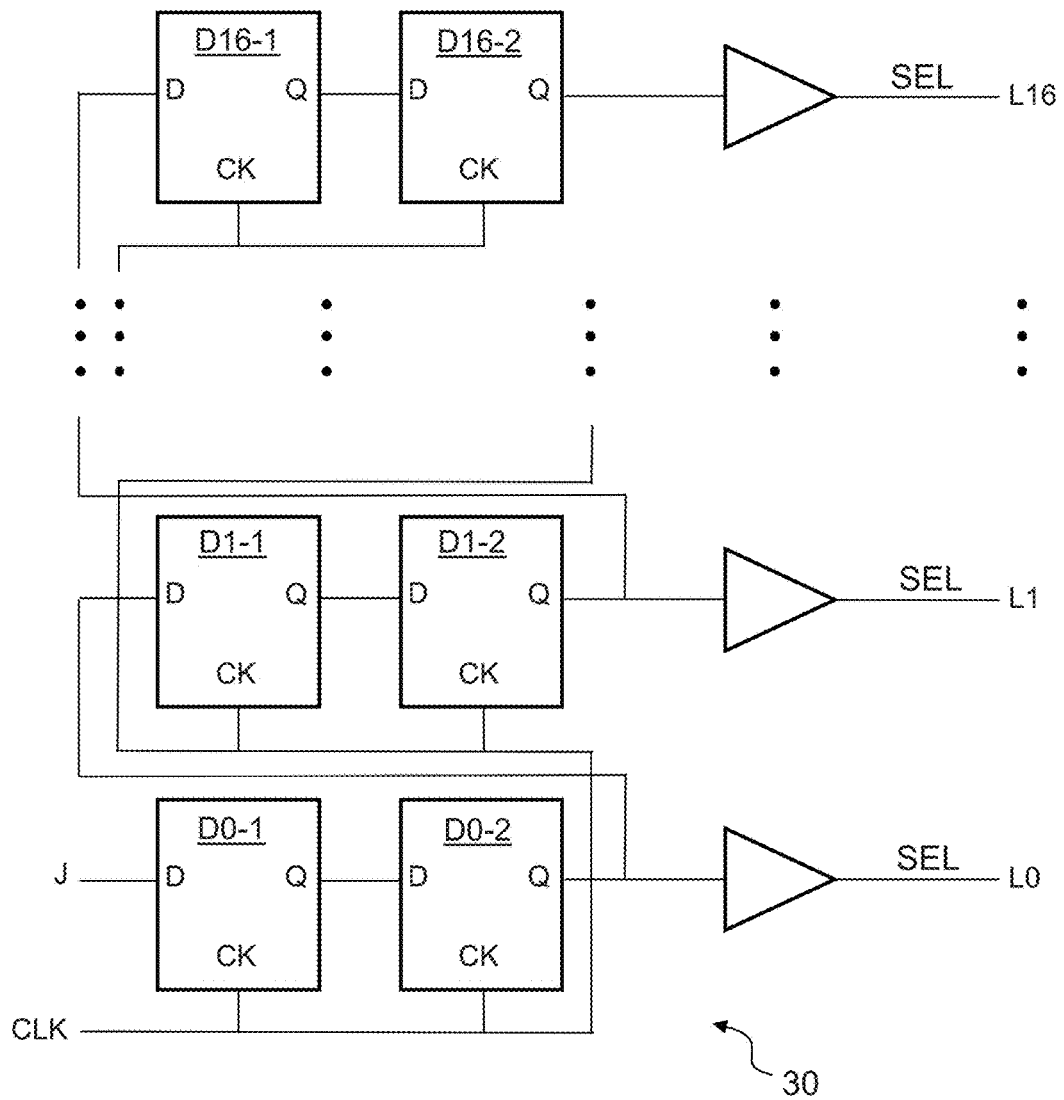
FIG. 4 shows a shift register allowing control signals for the device in FIG. 2 to be generated.

FIG. 4 shows an example of a shift register able to be used in the vertical register 26 to generate the signals SEL. For each row i, the signal SEL is formed using two flip-flops D: Di-1 and Di-2 connected in series. The output of the flip-flop Di-2 forms the signal SEL of the row i and is connected to the input of the flip-flop Di+1-1. A clock signal CLK is common to all of the flip-flops D. A token J is sent to the input of the flip-flop D0-1.

Figure 5:
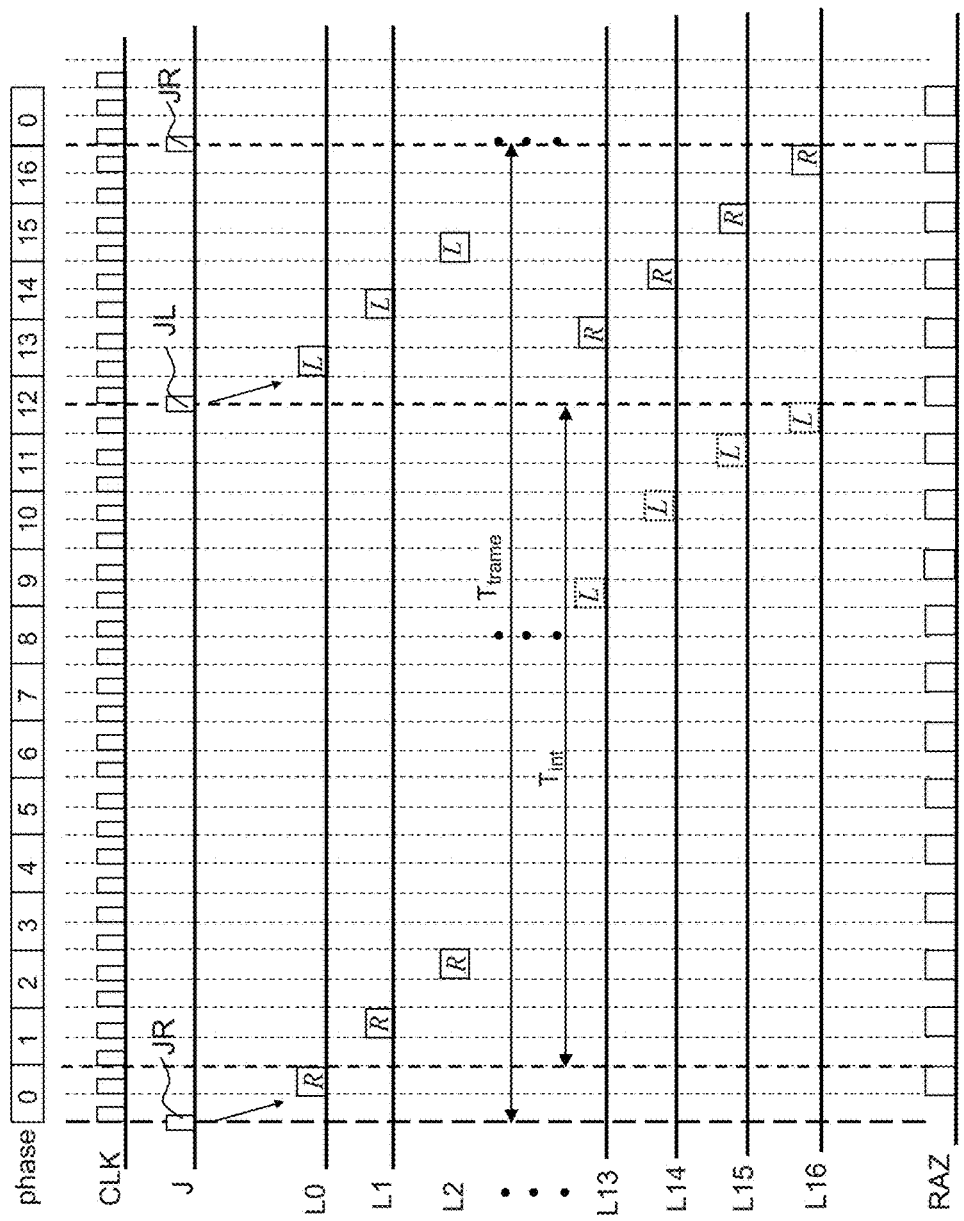
FIG. 5 shows, in the form of a timing diagram, various commands for the photosensitive device, adapted to the shift register in FIG. 4.

FIG. 5 shows, in the form of a timing diagram, various commands for the photosensitive device, which commands are adapted to the shift register shown in FIG. 4. The time axis is, as for FIG. 3, divided according to the readout phases of the various rows. As in FIG. 3, the signals SEL from the rows L0, L1, L2, L13, L14, L15 and L16 are featured, as well as the signal RAZ. FIG. 5 shows the clock signal CLK, the frequency of which is double that of the phases, as well as the token J. In a frame, the token J is introduced twice, once for the reset of a pixel row (empty readout) and another time for the readout per se. A shift of half a phase for the two tokens allows the obtention of either a simultaneous closure of the switches 15 and 22, for the reset at the beginning of integration, or a closure of the switch 15 followed by a closure of the switch 22 for the readout at the end of integration.

In FIG. 5, the first token denoted by JR is issued at the beginning of phase 0 and the second token denoted by JL is issued in the middle of phase 12. The time shift between the two tokens gives the duration of integration $T_{int}$, which is 12.5 phases in the example shown.

In the example shown, the two steps of the various phases have identical durations. This is mainly due to the frequency of the clock CLK, which is double that of the phases. However, the duration required for the charges accumulated in a pixel 10 to be transferred to the capacitor 21 of the readout circuit 11 during a readout operation (step Ei-1) is greater than the duration required for the reset of the capacitor 21 (step Ei-2). For the method to function correctly, while implementing a symmetrical clock, the clock frequency must be defined as a function of the step requiring the longest duration, in this case step Ei-1. The step Ei-2 is therefore needlessly prolonged. Advantageously, the duration of all of the steps Ei-2 is reduced in relation to the duration of the steps Ei-1. This allows the frame duration to be reduced. This differentiation of the durations of the steps Ei-1 and Ei-2 is for example implemented by means of an asymmetrical clock, the duration of a clock tick used for a step Ei-1 being longer than that of a clock tick used for a step Ei-2.

In the case of strong incident radiation (intense illumination) where a very short integration time is required, the pixels can saturate between the readout per se of the pixel and an upcoming reset. It was seen above that the charges accumulated in the pixel between the readout and the reset are evacuated to the column conductor 16 without being read out. Although these charges are not used, they are still liable to saturate the pixel with the risks already mentioned, crosstalk or an artefact in the form of a vertical line in the image. This risk of saturation is all the greater the shorter the desired duration of integration $T_{int}$ is in relation to the duration of a frame $T_{frame}$. To limit this risk of saturation, the pixels of a row can be reset multiple times before the beginning of the integration per se, the duration separating two successive resets being smaller than the predefined duration of integration $T_{int}$.

Figure 6:
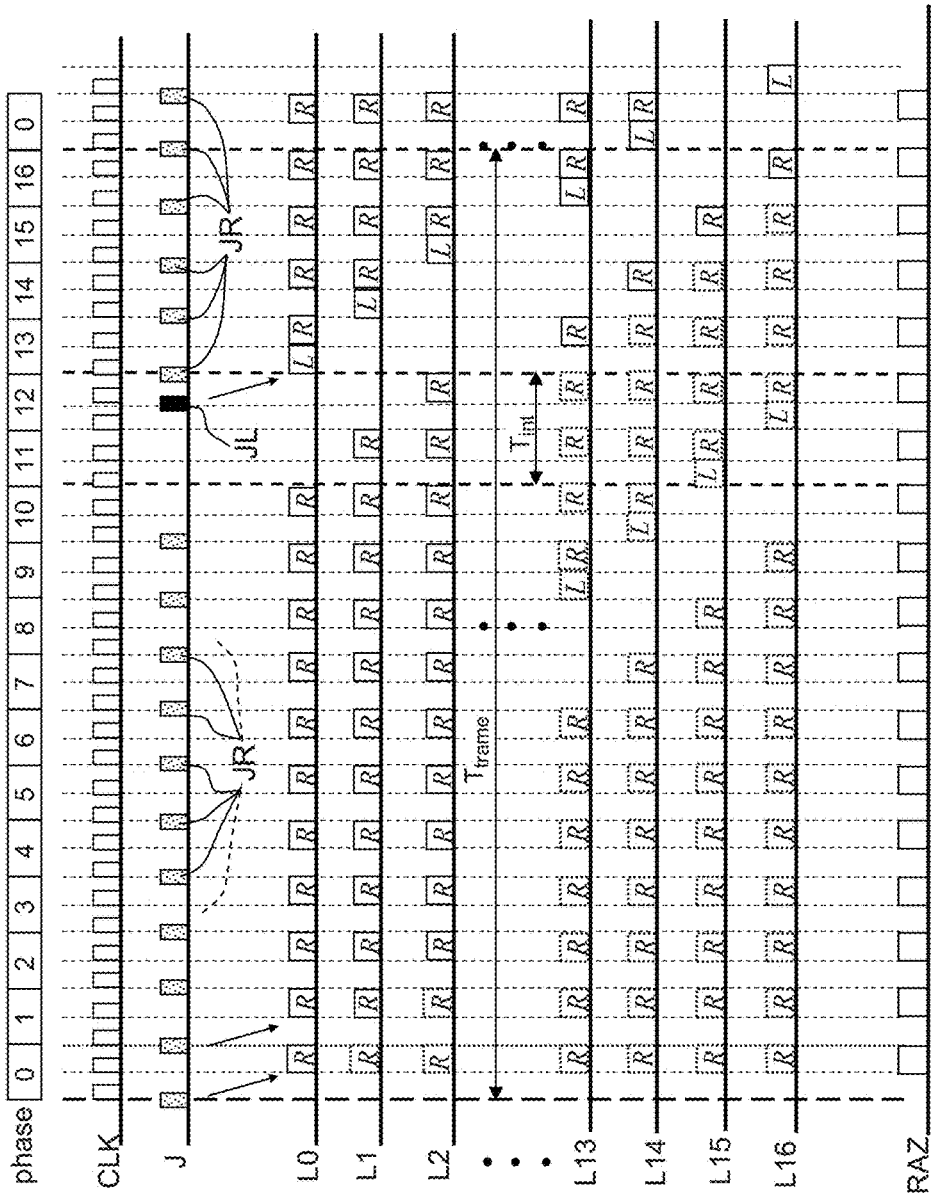
FIG. 6 shows, in the form of a timing diagram, various commands for the photosensitive device, adapted to multiple resetting.

FIG. 6 shows, in the form of a timing diagram, various commands for the photosensitive device, which commands are adapted to multiple resetting before the useful integration giving rise to the readout of the pixels. In the example shown, the duration of integration $T_{int}$ is equal to two times the duration of a phase, that is: $T_{int}=2 \cdot T_{ligne}$ ($T_{int}=k*T_{ligne}$, where k is equal to 2 in this example). It was previously seen that a token JR issued at the beginning of a readout phase generated a reset without readout and that a token JL issued in the middle of a readout phase generated a readout of the pixel. To carry out multiple resets, multiple tokens JR are issued. The duration of integration $T_{int}$ corresponds to the duration separating two successive tokens, the first of which is a token JR and the second a token JL. Tokens of JR type can be issued at the beginning of all of the readout phases which follow the token JL up to token JR marking the beginning of the duration of integration $T_{int}$. Outside of the integration time $T_{int}$, it is possible to reset the pixel in question systematically, as shown in FIG. 6. In other words, the first activation of the selector switch 15 is repeated on each deactivation of the readout circuit 11, except during the predefined duration of integration $T_{int}$. This systematic reset is of course not obligatory.

It is possible to implement the invention by carrying out the useful readout of each pixel by correlated double sampling. This allows potential leakage currents of the transistors 15 which share one and the same column and which superpose themselves over the required signal to be subtracted, and the amplifier 20 to be offset.

Figure 7:
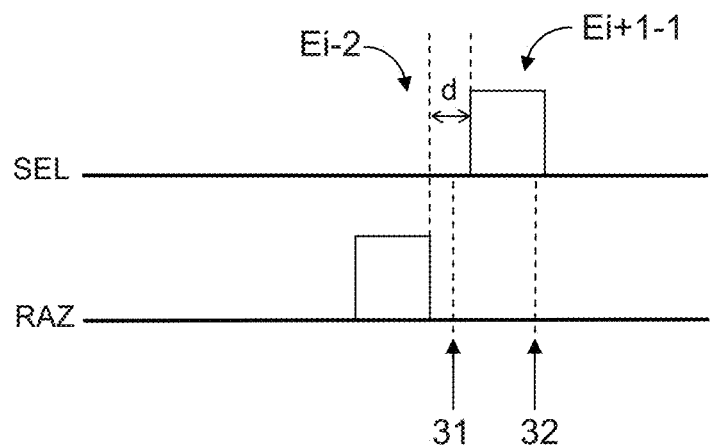
FIG. 7 shows an extract of a timing diagram illustrating a readout with double sampling.
Figure 8:
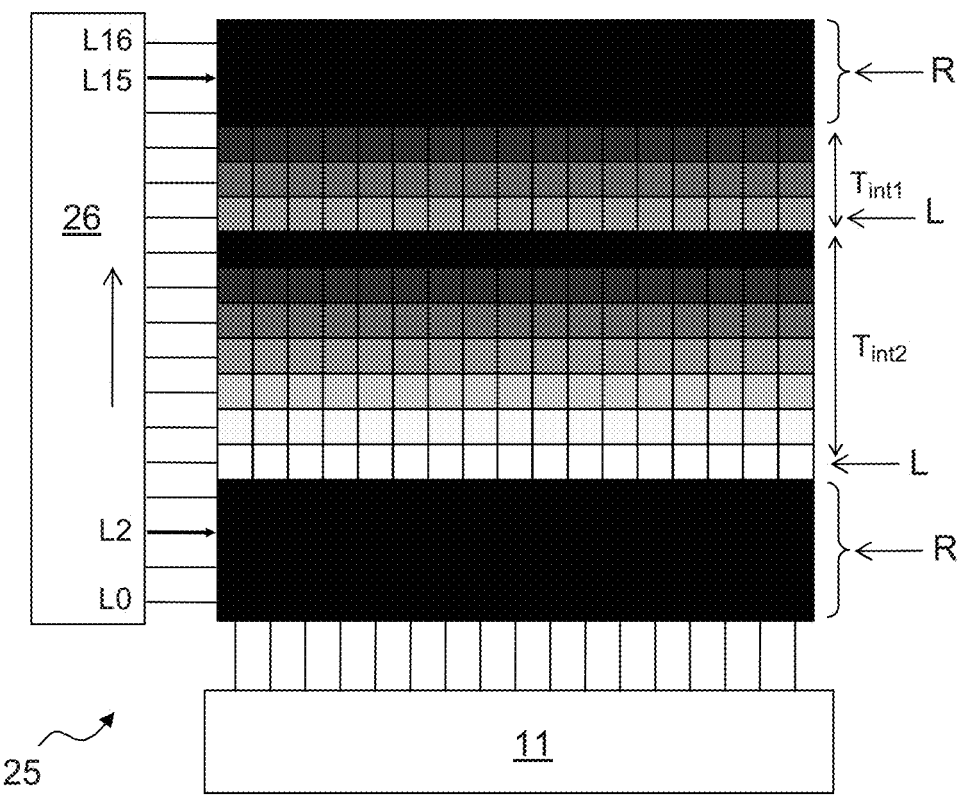
FIG. 8 shows a photosensitive device illustrating a method defining multiple distinct durations of integration.

FIG. 7 shows an extract of a timing diagram allowing the double sampling to be implemented. In FIG. 7, a signal SEL for a step Ei-2 and the signal RAZ for a step Ei+1-1 are shown. The double sampling consists of carrying out a first sampling 31 (switch 22 open) with all of the transistors 15 open just before a sampling 32 carried out for the readout per se of the pixel. During the processing of the image carried out downstream of the multiplexer, the signal arising from the first sampling 31 is subtracted from the signal arising from the second sampling. To carry out these two samplings, the signal SEL of the step Ei+1-1 can be shifted from the signal RAZ of the step Ei-2. A duration d illustrated in FIG. 7 shows this time shift. The first sampling 31 is carried out during the duration d. FIG. 8 shows a photosensitive device 25 illustrating a method defining multiple durations of integration $T_{int1}$ and $T_{int2}$. The method consists in reading out each of the pixels multiple times during a frame, each time with a different duration of integration $T_{int1}$ and $T_{int2}$. At the output of the readout circuit 11, multiple images are formed, each one with a distinct duration of integration. The images can then be merged to form a high-dynamic-range image. It is possible for example to attribute the values arising from a short integration multiplied by a gain factor equal to $T_{int2}/T_{int1}$ to the pixels saturated during a long integration.

In FIG. 8, the photosensitive device read out with two durations of integration is shown, one, $T_{int1}$, during 3 readout phases and the other, $T_{int2}$, during 7 readout phases. The first duration of integration $T_{int1}$ is initiated by a reset without readout of the corresponding pixel row. The two durations of integration can follow one after the other without downtime. In this case, the readout carried out at the end of the duration of integration $T_{int1}$ empties the charges accumulated in the pixels of the corresponding row and initiates the beginning of the second duration of integration $T_{int2}$. The reset occurring before the duration of integration $T_{int1}$ allows the two durations of integration $T_{int1}$ and $T_{int2}$ to be chosen more freely. The sum of the two durations of integration $T_{int1}$ and $T_{int2}$ can be smaller than the total duration of a frame $T_{trame}$.

Upon conclusion of the readout ending the duration of integration $T_{int2}$ and before initiating, in the following frame, a new duration of integration $T_{int1}$, it is possible, as proposed with the aid of FIG. 6, to carry out multiple resets in order to avoid any risk of saturating the pixels.

The timing diagram in FIG. 8 can be implemented by means of a register based on that of FIG. 4, for example by using three flip-flops per stage.

The invention claimed is:

1. A control method for a photosensitive device comprising a matrix of pixels distributed at the intersections of rows and columns of the matrix, each of the pixels comprising a photosensitive element able to generate an electrical signal under the effect of incident radiation and a selector switch controlled by a row conductor, the selector switch allowing the photosensitive element to be connected to a column conductor, the device further comprising a readout circuit connected to the column conductor to read out successively the various pixels connected to the column conductor, the method leading each of the pixels to activate the selector switch for said pixel a first time by deactivating the associated readout circuit and to activate the selector switch for said pixel a second time by activating the associated readout circuit, the duration separating the first activation and the second activation of the selector switch being equal to a predefined duration of integration, wherein the second activation of the selector switch occurs during a readout phase of a given first pixel row to which the selector switch in question belongs, and wherein the first activation of the selector switch of pixels of the given first row occurs during a readout phase of a second pixel row distinct from the first pixel row.

2. The control method according to claim 1, wherein readout phases of the various rows of the matrix are linked together, each readout phase comprising two successive steps, a first of the two steps consisting in activating the selector switch and the readout circuit, a second of the two steps consisting in deactivating the selector switch and in zeroing the readout circuit, wherein the first activation of the selector switch of the pixels of the given first row occurs during the second step of the readout phase of the second pixel row.

3. The control method according to claim 2, wherein the total number of pixel rows is defined by N, the duration of a readout phase is defined by Tligne and wherein the predefined duration of integration Tint=k*Tligne, where k is an integer smaller than or equal to N-2.

4. The control method according to claim 3, wherein the duration of the first step is greater than the duration of the second step.

5. The control method according to claim 1, wherein, the device comprising a vertical register, control signals for the selector switches are generated via the vertical register, which comprises a shift register the successive outputs of which generate the signals in the order of the pixel rows, the shift register receiving at least two time-shifted tokens, the first of the two tokens allowing the first activation of the selector switch to be initiated, the second of the two tokens allowing the second activation of the selector switch to be initiated.

6. The control method according to claim 1, wherein, for each of the pixels, the first activation of the selector switch is repeated multiple times, the duration separating two successive first activations being smaller than the predefined duration of integration.

7. The control method according to claim 6, wherein for each of the pixels the first activation of the selector switch is repeated on each deactivation of the readout circuit, except during the predefined duration of integration.

8. The control method according to claim 1, wherein multiple distinct durations of integration are predefined, at least one of the durations of integration being preceded by the first activation of the selector switch by deactivating the associated readout circuit.

9. A photosensitive device implementing a control method for a photosensitive device comprising a matrix of pixels distributed at the intersections of rows and columns of the matrix, each of the pixels comprising a photosensitive element able to generate an electrical signal under the effect of incident radiation and a selector switch controlled by a row conductor, the selector switch allowing the photosensitive element to be connected to a column conductor, the device further comprising a readout circuit connected to the column conductor to read out successively the various pixels connected to the column conductor, the method leading each of the pixels to activate the selector switch for said pixel a first time by deactivating the associated readout circuit and to activate the selector switch for said pixel a second time by activating the associated readout circuit, the duration separating the first activation and the second activation of the selector switch being equal to a predefined duration of integration, wherein the second activation of the selector switch occurs during a readout phase of a given first pixel row to which the selector switch in question belongs, and wherein the first activation of the selector switch of pixels of the given first row occurs during a readout phase of a second pixel row distinct from the first pixel row, the device comprising a vertical register configured to control the switches and the readout circuit in such a way as to implement the method.

* * * * *